United States Patent
Senoo et al.

(10) Patent No.: US 7,180,614 B1
(45) Date of Patent: Feb. 20, 2007

(54) DISTRIBUTED RENDERING OF PRINT JOBS

(75) Inventors: Masumi Senoo, Hino (JP); Kazuo Aoyama, Hino (JP); Shahzad H. Bhatti, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 505 days.

(21) Appl. No.: 09/506,418

(22) Filed: Feb. 17, 2000

(51) Int. Cl.
*G06F 3/12* (2006.01)
(52) U.S. Cl. .................................. 358/1.15; 358/1.14
(58) Field of Classification Search ...... 358/1.14–1.15; 709/202, 205; 395/114
See application file for complete search history.

(56) References Cited

U.S. PATENT DOCUMENTS 5,577,172 A * 11/1996 Vatland et al. ............. 358/1.15
6,003,069 A * 12/1999 Cavill ........................ 709/205

* cited by examiner

*Primary Examiner*—Thomas D. Lee
*Assistant Examiner*—Stephen Brinich

(57) ABSTRACT

A printer handles a print job by determining whether the entire print job can be processed locally by the printer. If possible, the printer processes the print job locally. If the entire print job cannot be processed locally, then the printer sends the print job (or a portion of the print job) to an external rendering device. The printer receives a rendered print job (or a rendered portion of a print job) from the external rendering device. Finally, the printer prints the rendered print job. If different portions of the print job require processing by different external rendering devices, then portions of a particular print job may be distributed to multiple external rendering devices. An external rendering device may be a server coupled to the printer via the Internet.

17 Claims, 5 Drawing Sheets

DISTRIBUTED RENDERING OF PRINT JOBS

TECHNICAL FIELD

The present invention relates to printing devices and print rendering engines. More particularly, the invention relates to a system that allows one or more external print rendering devices to assist a printer in rendering a print job.

BACKGROUND

In many situations, a printing device (such as a printer) is coupled to a processing device, such as a personal computer or a workstation that helps render a print job printed by the printing device. The processing device generates one or more print jobs to be printed on the printer. For example, the print jobs can be generated by one or more application programs executed by the processing device. The print jobs may include any type of graphical elements or information supported by the printer, including text, pictures, and so forth. The processing device typically translates the print job into a language that is understood by the printer, such as Printer Control Language (PCL) or Postscript. A particular printer may understand a single language, thereby requiring the processing device to translate the print job into that single language. This type of printer requires an attached processing device to convert the raw print job data into a format (i.e., language) that is understood by the printer.

Other printers may be capable of processing print jobs in multiple languages. These printers are typically more complicated because they are required to identify, interpret and process print commands in several different languages. Although these printers are more complicated, they typically require an attached processing device to provide the print job and other printer control information to the printer. Another type of printer contains its own print rendering engine that is capable of generating a printed output document from raw print job data. Although this type of printer contains its own print rendering engine, it is typically coupled to a processing device, such as a computer, to receive the raw print job data generated, for example, by an application running on the computer.

Connecting each printer to a computer or other processing device increases the overall cost of supporting the printer. If the printer is more sophisticated (e.g., has its own print rendering engine), then the printer requires fewer processing resources from the computer. However, if the printer is inexpensive or supports a limited number of languages, then the computer may be required to perform more processing of the print job prior to communicating the print job to the printer.

The invention described herein provides an improved printing system that allows the distribution of print rendering functions to one or more remote print rendering engines.

SUMMARY

The present invention allows a printer to send portions of a print job to one or more remote print rendering devices, which assist the printer by rendering a portion of the print job and returning the rendered portion of the print job to the printer. Thus, the printer may have a simple print rendering engine that relies on other print rendering devices to process complex print jobs.

In one embodiment, a print job is handled by first determining whether the entire print job can be processed locally. The print job is processed locally, if possible. If the entire print job cannot be processed locally, then the print job is sent to an external rendering device. A rendered print job is received from the external rendering device and printed.

According to one aspect of the invention, a portion of the print job that cannot be processed locally is sent to an external rendering device.

According to another aspect of the invention, a first portion of the print job that cannot be processed locally is sent to a first external rendering device and a second portion of the print job that cannot be processed locally is sent to a second external rendering device.

In a particular embodiment, the external rendering device is a server accessible via the Internet.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

The present invention allows a printer to send all or part of a print job to one or more remote print rendering devices, which assist the printer by rendering all or part of the print job and returning the rendered portion of the print job to the printer. This allows the printer to have a simple print rendering engine that relies on other print rendering devices to process complex print jobs.

Figure 1:
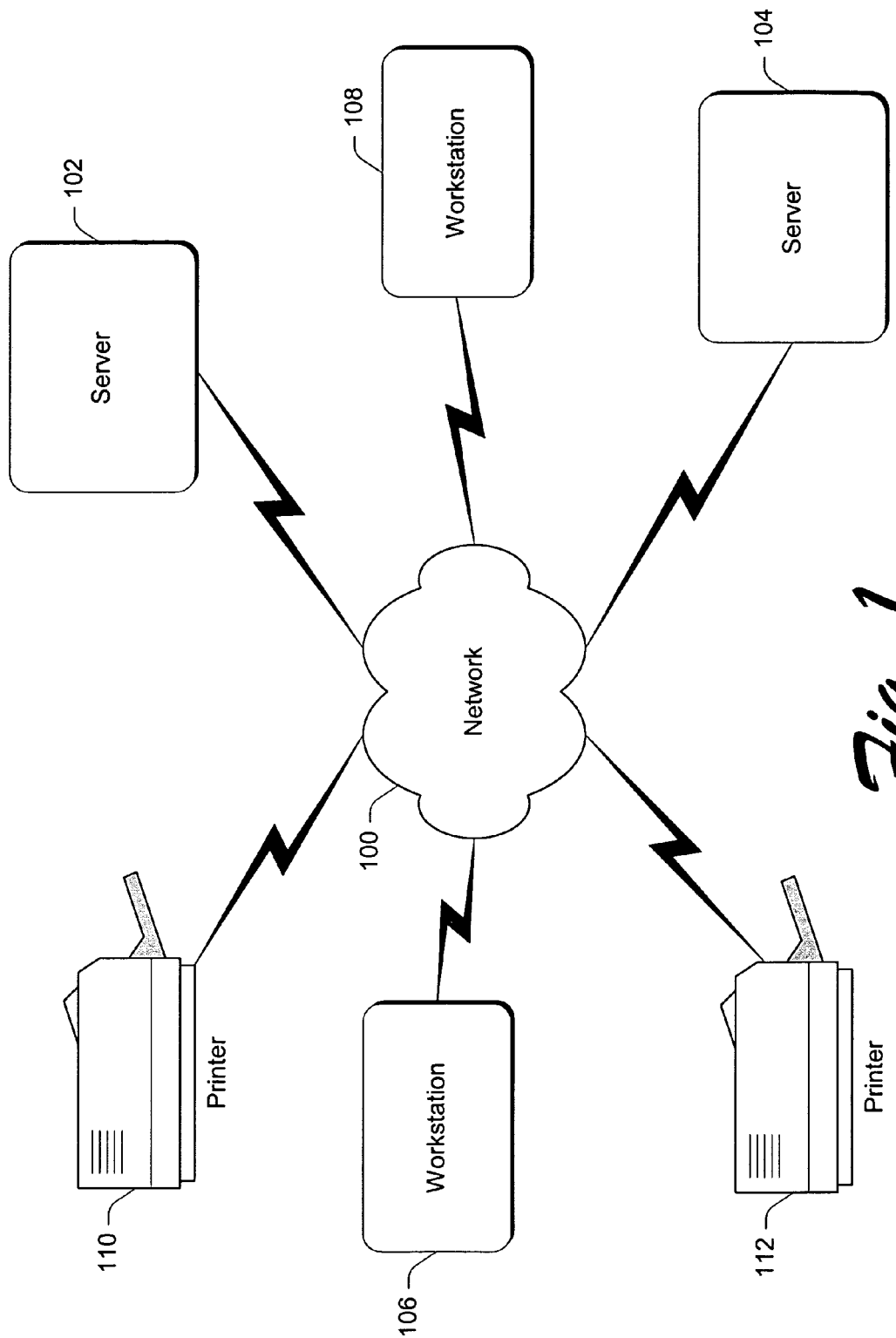
FIG. 1 illustrates a network environment in which multiple servers, workstations, and printers are coupled to one another via a data communication network.

FIG. 1 illustrates a network environment in which multiple servers, workstations, and printers are coupled to one another via a data communication network 100. The network 100 couples together servers 102 and 104, computer workstations 106 and 108, and printers 110 and 112. Network 100 can be any type of network, such as a local area network (LAN) or a wide area network (WAN), using any type of network topology and any network communication protocol. In a particular embodiment, network 100 is the Internet. Although only a few devices are shown coupled to network 100, a typical network may include tens or hundreds of devices coupled to one another. Furthermore, network 100 may be coupled to one or more other networks, thereby providing coupling between a greater number of devices.

Servers 102 and 104 may be file servers, email servers, database servers, print servers, or any other type of network server. Workstations 106 and 108 can be any type of computing device, such as a personal computer. Particular embodiments of the invention illustrate printers 110 and 112 as laser printers. However, alternate embodiments of the invention are implemented with ink-jet, bubble-jet or any other type of printer. Furthermore, the teachings of the present invention may be applied to any type of printing device, such as copiers and fax machines. Although not shown in FIG. 1, one or more workstations and/or servers may contain a print rendering engine capable of converting raw print job data into a particular format (e.g., language) understood by certain types of printers. As further discussed below, a printer menu editor application is executed on workstation 106 or 108, or on server 102 or 104, to create or modify a printer menu structure. After the printer menu structure has been completed, the menu is "installed" by communicating the menu data across network 100 to one or more printers, such as printer 110 or 112.

Figure 2:
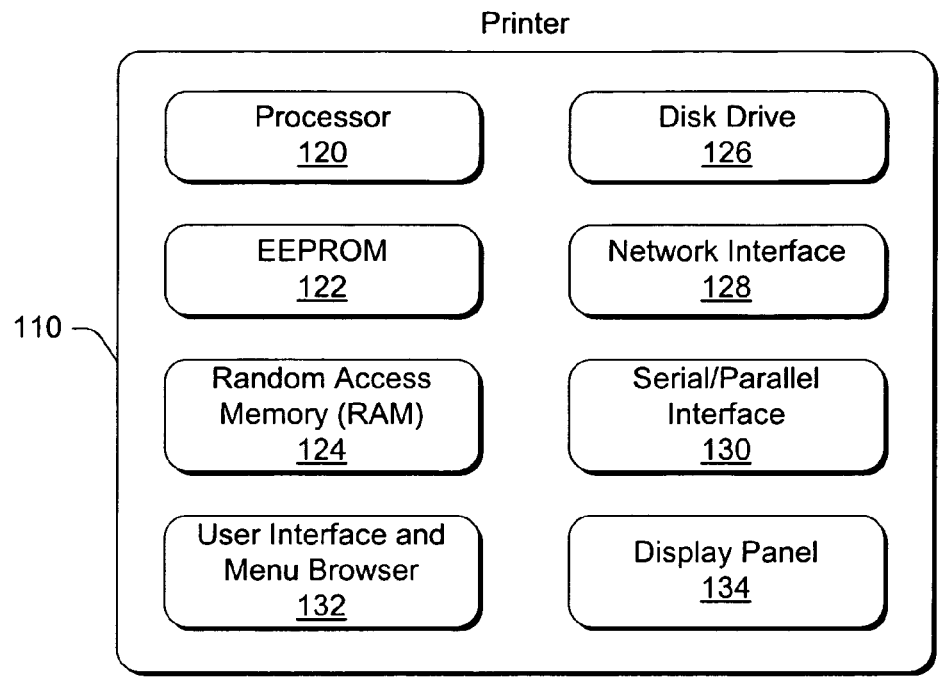
FIG. 2 is a block diagram showing pertinent components of a printer in accordance with the invention.

FIG. 2 is a block diagram showing pertinent components of printer 110 in accordance with the invention. Printer 110 includes a processor 120, an electrically erasable programmable read-only memory (EEPROM) 122, and a random access memory (RAM) 124. Processor 120 processes various instructions necessary to operate the printer 110 and communicate with other devices. EEPROM 122 and RAM 124 store various information such as configuration information, fonts, templates, data being printed, and menu structure information. Although not shown in FIG. 2, a particular printer may also contain a ROM (non-erasable) in place of or in addition to EEPROM 122.

Printer 110 also includes a disk drive 126, a network interface 128, and a serial/parallel interface 130. Disk drive 126 provides additional storage for data being printed or other information used by the printer 110. Although both RAM 124 and disk drive 126 are illustrated in FIG. 2, a particular printer may contain either RAM 124 or disk drive 126, depending on the storage needs of the printer. For example, an inexpensive printer may contain a small amount of RAM 124 and no disk drive 126, thereby reducing the manufacturing cost of the printer. Network interface 128 provides a connection between printer 110 and a data communication network, such as network 100. Network interface 128 allows devices coupled to a common data communication network to send print jobs, menu data, and other information to printer 110 via the network. Similarly, serial/parallel interface 130 provides a data communication path directly between printer 110 and another device, such as a workstation, server, or other computing device. Although the printer 110 shown in FIG. 2 has two interfaces (network interface 128 and serial/parallel interface 130), a particular printer may only contain one interface.

Printer 110 also contains a user interface/menu browser 132 and a display panel 134. User interface/menu browser 132 allows the user of the printer to navigate the printer's menu structure. User interface 132 may be a series of buttons, switches or other indicators that are manipulated by the user of the printer. Display panel 134 is a graphical display that provides information regarding the status of the printer and the current options available through the menu structure. In a particular embodiment of the invention, the display panel 134 is a liquid crystal display having a two-dimensional array of pixels capable of generating various fonts, icons, and other images. In one implementation of the invention, user interface 132 is a touch-sensitive screen that overlays display panel 134. Thus, the user can provide input to the printer 110 by touching the appropriate portion of the touch screen. The touch screen is substantially transparent such that the images displayed on panel 134 are visible to the user through the touch screen. The touch screen may be used in combination with one or more physical buttons or switches on the printer.

The printer 110 display panel 134 displays various menu options to the user of the printer. The display panel and associated control buttons allow the user of the printer to navigate the printer's menu structure. An exemplary printer menu structure has a hierarchy of menu elements. When one of the menu elements is selected, the printer display changes to illustrate the new menu elements in the next level of the hierarchy. Alternatively, if the selected menu element is a printer function or other action, the appropriate procedure is performed. For example, if the selected menu element prints a particular document, then the printer performs the necessary operations to print the document.

Figure 3:
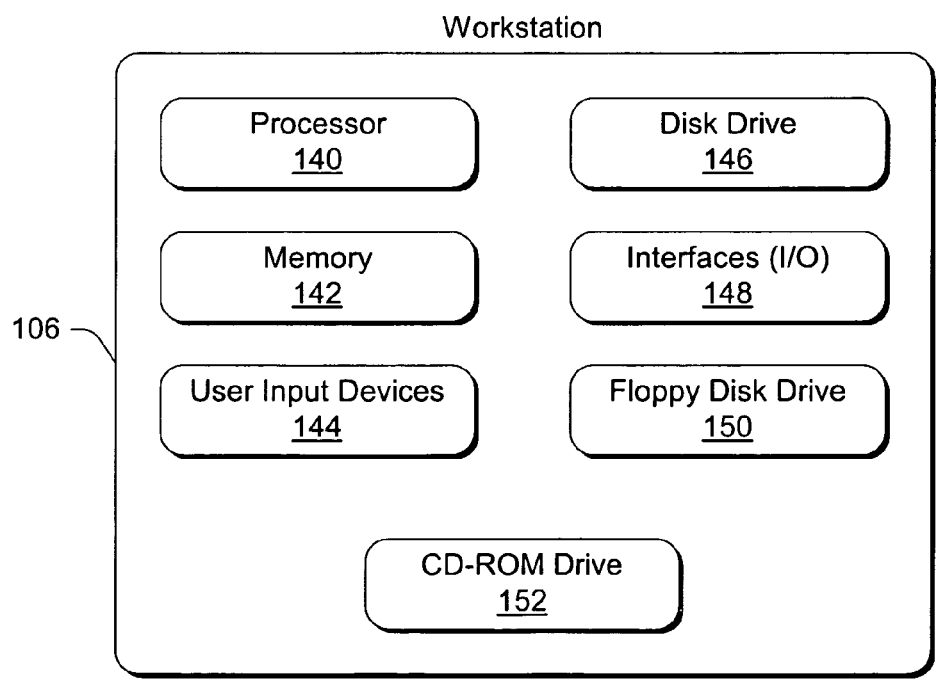
FIG. 3 is a block diagram showing pertinent components of a computer workstation in accordance with the invention.

FIG. 3 is a block diagram showing pertinent components of a computer workstation 106 in accordance with the invention. Workstation 106 includes a processor 140, a memory 142 (such as ROM and RAM), user input devices 144, a disk drive 146, interfaces 148 for inputting and outputting data, a floppy disk drive 150, and a CD-ROM drive 152. Processor 140 performs various instructions to control the operation of workstation 106. Memory 142, disk drive 146, and floppy disk drive 150, and CD-ROM drive 152 provide data storage mechanisms. User input devices 144 include a keyboard, mouse, pointing device, or other mechanism for inputting information to workstation 106. Interfaces 148 provide a mechanism for workstation 106 to communicate with other devices.

Figure 4:
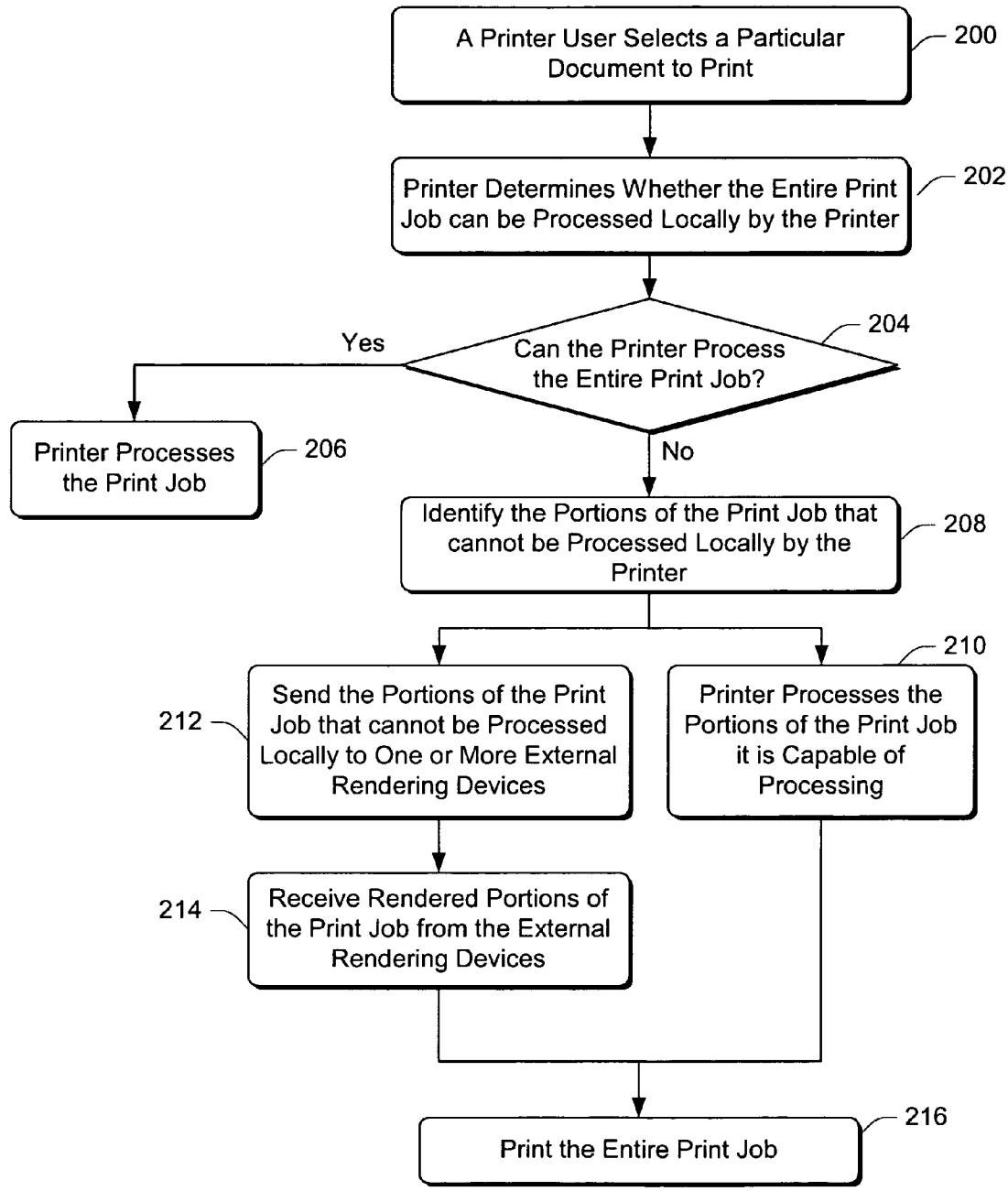
FIG. 4 is a flow diagram illustrating a procedure for processing a particular print job.

FIG. 4 is a flow diagram illustrating a procedure for processing a particular print job. Initially, a printer user selects a particular document to print (step 200), for example, by selecting a document from the menu of documents displayed on the printer's display panel. In this example, the document is stored within the printer. However, other embodiments access the document from another device coupled to the printer (such as a workstation or a server). The printer determines whether the entire print job (i.e., the entire document) can be processed locally by the printer (step 202). To process the entire print job locally, the printer must be able to interpret the language or format in which the document is stored. For example, if the document data is stored in a raw data format and the printer only understands the Printer Control Language (PCL) language, then the printer cannot process the document until some other device or process converts the raw data into a PCL format. However, if the document is already stored in a format that is understood by the printer, then the printer can process the document without assistance from an external device.

If the printer can process the entire print job, then the document is printed by the printer (step 206). If the printer cannot process the entire print job, then the printer identifies the portions of the document (i.e., print job) that it cannot process locally (step 208). In certain cases, the printer may be unable to process any part of the document, thereby requiring the entire document to be processed externally. In other situations, a portion of the print job may be in a format understood by the printer, while other portions of the print job are in a format not understood by the printer. In this situation, only the portions that are not understood by the printer need to be processed by an external device or process.

The printer begins processing the portions of the print job that it is capable of printing (step 210). At the same time, the printer sends the portions of the print job that cannot be processed by the printer to one or more external devices that will render those portions of the print job (step 212). Multiple external devices may be used if several different formats are used in the print job or to increase the overall speed at which the print job is rendered. After the external devices have rendered portions of the print job, the rendered portions are returned to the printer for printing (step 214). The printer then prints the entire print job by combining the portions of the print job processed by the printer with the portions processed by an external device (step 216).

In a particular embodiment, the printer can only render documents that are formatted in the native language of the printer. Thus, the printer may require all portions of a particular print job to be processed by an external rendering device if all portions of the print job are in a non-native language of the printer. By supporting only a native printing language, the cost of such a printer is reduced.

Figure 5:
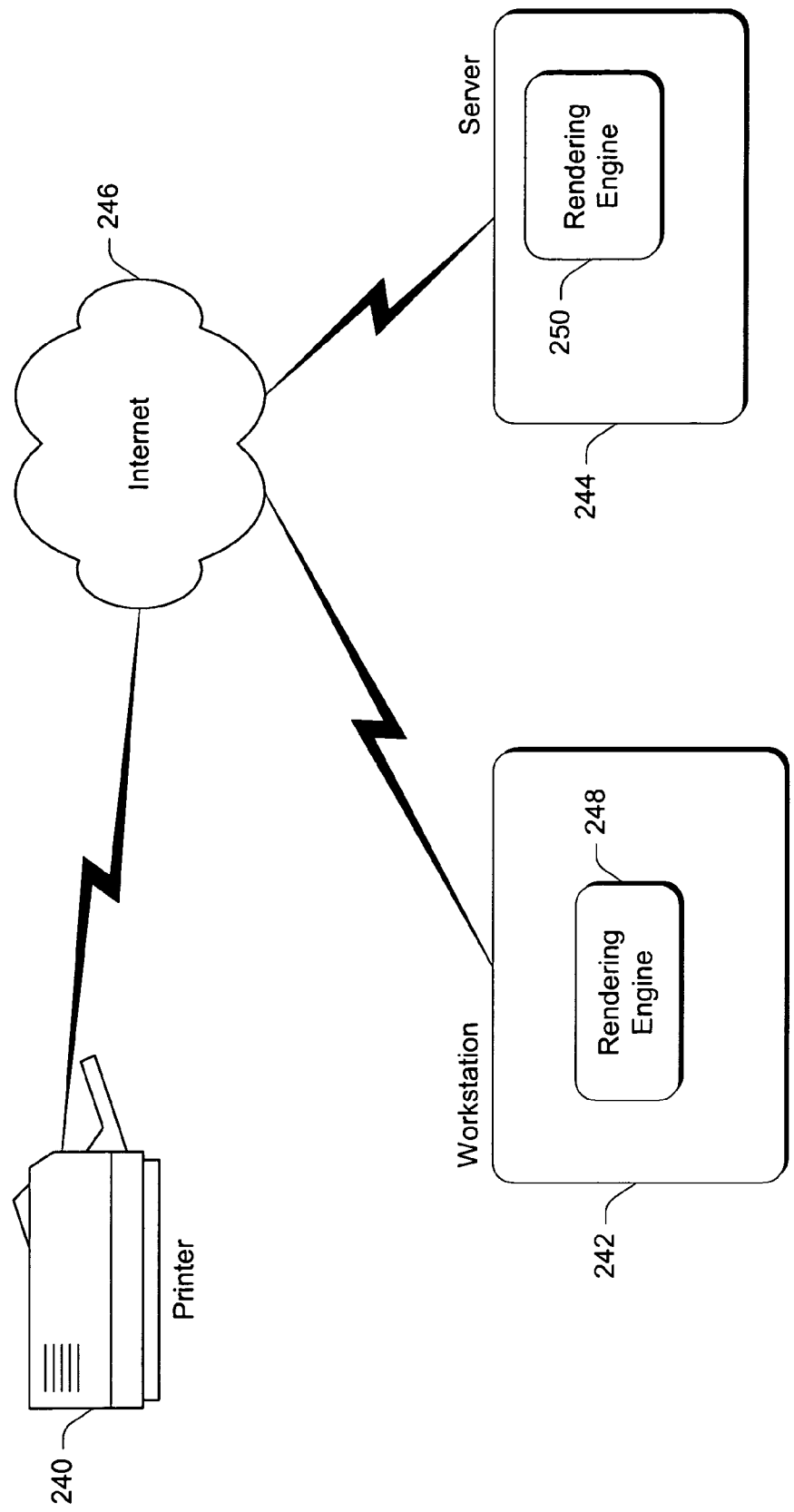
FIG. 5 illustrates a workstation, a server, and a printer coupled together via the Internet.

FIG. 5 illustrates a workstation 242, a server 244, and a printer 240 coupled together via the Internet 246. The workstation 302 includes a rendering engine 248 that is capable of processing data into a format understood by printer 240. Similarly, the server 244 includes a rendering engine 250 that can process raw data into a language understood by printer 240. Rendering engines 248 and 250 are capable of rendering a document into a directly printable format by incorporating any fonts, templates, or other data required to render the document.

In the example of FIG. 5, printer 240 may be an inexpensive printer with a modest print engine. To print most documents, printer 240 will require assistance from rendering engine 248 and/or 250. Rendering engines 248 and 250 may process the same types of data or may each process a different type of data. For example, rendering engine 248 may process data into a PCL format and rendering engine 250 processes data into a Postscript format. Thus, if the printer 240 can interpret PCL, then print jobs for that printer would typically be processed by rendering engine 248. Other printers (not shown) that can interpret Postscript, would typically have their print jobs processed by rendering engine 250. In another example, rendering engine 248 renders textual data and rendering engine 250 renders photographic data. Thus, the printer 240 may use either or both rendering engines 248 and 250 depending on the content of the print job being processed.

Figure 6:
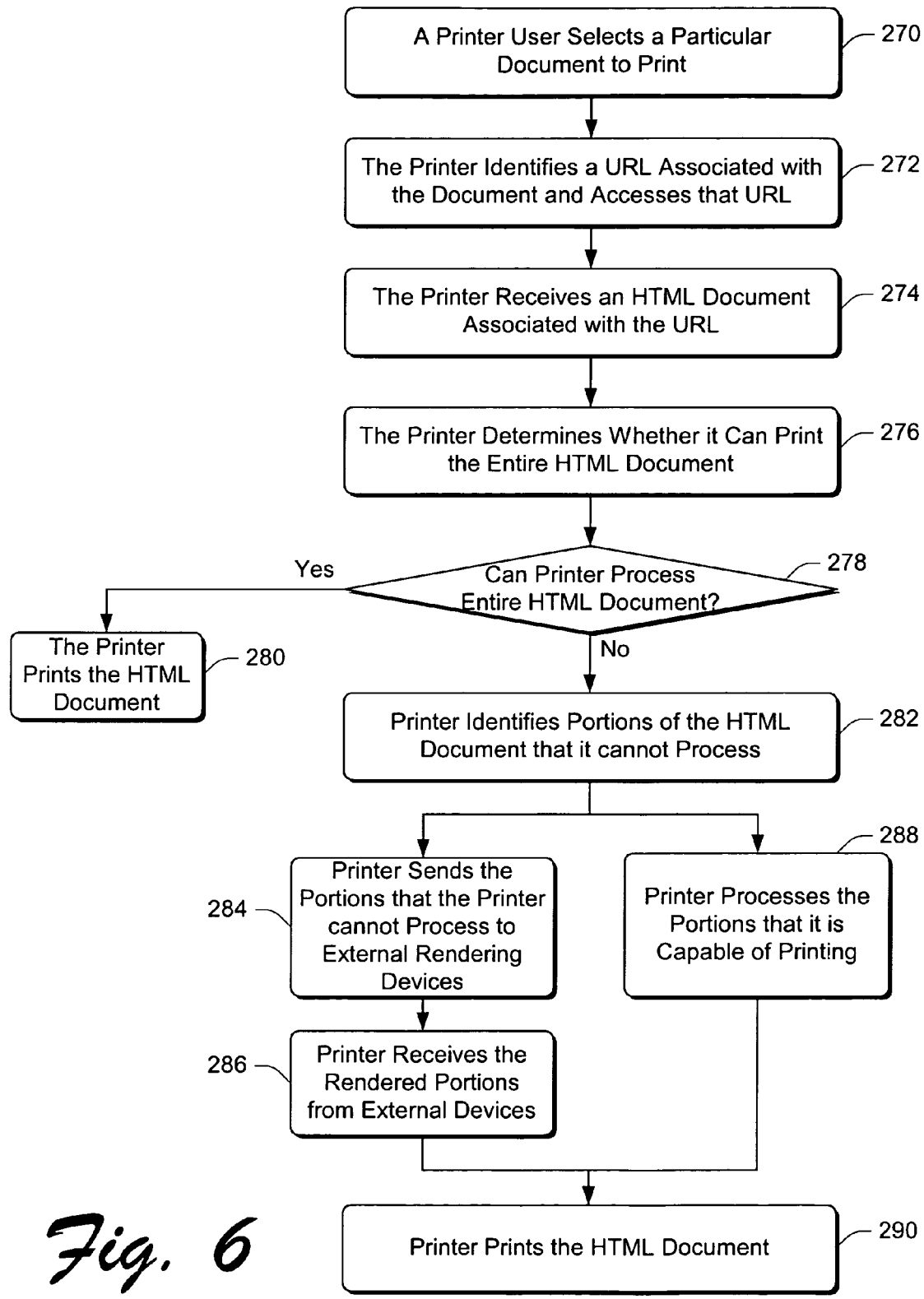
FIG. 6 is a flow diagram illustrating a procedure for retrieving and printing a document.

FIG. 6 is a flow diagram illustrating a procedure for retrieving and printing a document. A printer user selects a particular document to print (step 270). In this example, the selected document is not stored within the printer. Instead, the selected document is stored on a remote server which is accessible via a network such as the Internet. In this example, the location of the actual document is identified by a Uniform Resource Locator (URL). The printer identifies the URL associated with the document and accesses that URL (step 272). The printer receives an HTML document associated with the accessed URL (step 274). This HTML document may be accessed by multiple printers coupled to the same network. Thus, a single server or workstation on the network can store a common copy of the document that is accessed by all printers, thereby eliminating the need to store the same document in multiple printers or on multiple servers.

The printer determines whether it can process the entire HTML document (step 276). If the printer can process the entire HTML document, then the printer processes the document (step 280). Otherwise, the printer identifies one or more portions of the HTML document that it cannot process (step 282). The printer then sends the portions of the document that the printer cannot process to one or more external rendering devices (step 284). At the same time, the printer processes the portions of the document that it is capable of printing (step 288). In a particular example, the entire HTML document is processed by an external rendering device. The printer receives the rendered portions of the document from the external devices (step 286). The printer then prints the HTML document by combining the portions processed by the external devices with the portions processed by the printer (step 290).

In the example of FIG. 6, the printer does not require a local computer or other processing device connected to the printer. Instead, the printer communicates an appropriate rendering engine via the Internet. Thus, the printer may be located anywhere that an Internet connection can be established. Furthermore, the cost of operating the printer is reduced because a local processing device is not required. The processing requirements for the printer can be handled by one or more servers or other processing devices coupled to the Internet. For example, a single server coupled to the Internet may support tens or hundreds of individual printers. Additionally, a single printer may support multiple types of documents (e.g., Postscript, HTML, and PCL) by accessing a processing device with the appropriate rendering engine. The rendering engine renders the document in the native language of the printer, such that no further translation of the document is required.

In an alternate embodiment, step 284 provides a pointer to an external rendering device that identifies the portion of the document that requires processing. The external rendering device then retrieves those portions of the document from the server or other device that contains the document. This eliminates the need for the printer to transmit the portions of the document to the external rendering device.

The printers described herein are particularly useful for printing product brochures and other literature regarding products and services offered by a particular organization. The printer can be "self-serve" by allowing a user to select their desired documents using the printer's menu, without requiring any other personnel to help operate the printer. Other applications for this type of printer include generating documents related to the user's financial account (e.g., bank account, brokerage account, or credit card account). Other financial documents such as a listing of current interest rates or a blank loan application can be printed by the printer.

Thus, a distributed print rendering system has been described herein that allows a printer to send portions of a print job to one or more remote print rendering devices. These remote print rendering devices assist the printer by rendering a portion of the print job and returning the rendered portion of the print job to the printer. This distributed print rendering system allows the printer to have a simple print rendering engine that relies on other print rendering devices to process complex print jobs.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method of handling a print job, the method comprising:
    determining whether the entire print job can be processed by a printer;
    processing the print job, by the printer, if the entire print job can be processed by the printer;
    if the entire print job cannot be processed by the printer;
        sending, by the printer, the print job to an external rendering device;
        receiving, by the printer, a rendered print job from the external rendering device; and
        the printer printing the rendered print job received from the external rendering device.

2. A method as recited in claim 1 wherein sending the print job to an external rendering device includes sending, by the printer, a portion of the print job that cannot be processed by the printer to an external rendering device.

3. A method as recited in claim 1 wherein sending the print job to an external rendering device includes sending, by the printer, a first portion of the print job that cannot be processed by the printer to a first external rendering device and sending, by the printer, a second portion of the print job that cannot be processed by the printer to a second external rendering device.

4. A method as recited in claim 1 wherein the external rendering device is accessible via the Internet.

5. A method as recited in claim 1 wherein the external rendering device is a server coupled to the Internet.

6. A method as recited in claim 1 wherein determining whether the entire print job can be processed by the printer is performed by the printer.

7. A computer-readable memory containing a computer program that is executable by a processor to perform the method recited in claim 1.

8. A method comprising:
   receiving, by a printer, a print job;
   the printer identifying portions of the print job that can be processed by the printer;
   the printer processing the identified portions of the print job;
   the printer sending the portions of the print job that cannot be processed by the printer to an external rendering device; and
   the printer receiving rendered portions of the print job from the external rendering device.

9. A method as recited in claim 8 further including the printer printing the print job by combining portions processed by the printer and rendered portions received from the external rendering device.

10. A method as recited in claim 8 wherein sending the portions of the print job that cannot be processed by the printer to an external rendering device includes the printer sending a first portion of the print job that cannot be processed by the printer to a first external rendering device and the printer sending a second portion of the print job that cannot be processed by the printer to a second external rendering device.

11. A method as recited in claim 8 wherein the external rendering device is accessible via the Internet.

12. A method as recited in claim 8 wherein the external rendering device is a server coupled to the Internet.

13. A computer-readable memory containing a computer program that is executable by a processor to perform the method recited in claim 8.

14. A printer comprising:
   a communication interface; and
   a processor coupled to the communication interface, wherein the processor determines whether an entire print job can be processed by the printer, if the entire print job cannot be processed by the printer, then the printer sends the portions of the print job that cannot be processed by the printer to an external rendering device, and the printer receives rendered portions of the print job from the external rendering device.

15. A printer as recited in claim 14 wherein the communication interface is a network communication interface coupled to the Internet.

16. A printer as recited in claim 14 wherein the external rendering device is a server coupled to the communication interface.

17. A printer as recited in claim 14 wherein the printer sends a first portion of the print job that cannot be processed by the printer to a first external rendering device and the printer sends a second portion of the print job that cannot be processed by the printer to a second external rendering device.

* * * * *